Patented Apr. 19, 1938

2,114,796

UNITED STATES PATENT OFFICE 2,114,796

PETROLEUM RESIN AND PROCESS OF MAKING SAME

Everett H. Crawley, Louisville, Ky.

No Drawing. Application November 11, 1935,
Serial No. 49,267

15 Claims. (Cl. 196—13)

This invention relates to a new and novel petroleum resin and process of producing same and in its more specific aspects it relates to petroleum resins derived from the residue remaining after the solvent treatment of hydrocarbon oils.

In the treatment of hydrocarbon oils, it is well known today to those skilled in the art to subject the hydrocarbon oil to solvent treatment to separate the oil into substantially paraffinic and substantially non-paraffinic constituents. It is recognized that a complete or sharp separation does not result from the solvent treatment and that while there is a concentration of the non-paraffinic fractions in the solvent layer, some paraffinic constituents will be retained in the solvent layer. The hydrocarbon oil may comprise crude oil, topped crude, or any fraction of the crude oil including fractions containing lubricating oil constituents. The solvents which have been used include liquid sulphur dioxide, nitrobenzene, dichloroethyl-ether, aqueous phenol, phenol, alcohol-ether mixtures, acetone, methyl acetate, methyl cellosolve phenol acetate, cellosolve acetate, furfural, acetone aniline, and the like. The solvent refining of lubricating oils is a well known and widely commercially used method in use at the present day.

I have found that the residues or extracts resulting from the solvent refining of hydrocarbon oils contain asphaltenes, naphthenes, paraffins, aromatics, and resinous bodies. When these extracts are treated according to the present invention as hereinafter described, the asphaltenes and paraffins are removed and a resinous product recovered as a product of the process which has very desirable properties for use in the arts.

It is an object of the present invention to treat the residue or extract obtained from the solvent refining of hydrocarbon oil to obtain a resinous product having the property of absorbing oxygen and having drying characteristics similar to vegetable and marine drying oils, natural resins, and certain types of synthetic resins.

The resinous product of the present invention is adaptable for use as a substitute or partial substitute for the drying oils used in the manufacture of paints, varnishes, coatings, core oils, and in fact any other product wherein drying oils or oils or resins having the property of absorbing oxygen are now used.

In carrying out the process, I prefer to treat extracts or residues obtained from the solvent treatment of hydrocarbon oil containing in excess of 1% paraffin, although in its broad aspects, the invention may be utilized in the treatment of the extract resulting from the solvent treatment of any type of hydrocarbon oil regardless of paraffin content as long as such extract had not been previously subjected to thermal decomposition or treated with an acid, acid anhydride, metallic halides, or other such chemicals or reagents commonly used to remove unstable gum and color-forming constituents, under conditions which would destroy the constituents which produce the resins which I desire to recover from the extract.

The following is an illustrative example of the use of the process of the present invention in the treatment of the extract resulting from the solvent refining of lubricating oil with furfural, although as hereinbefore pointed out, the invention is not to be limited to the treatment of an extract obtained from the solvent refining of lubricating oil and is not to be limited to the type of solvent disclosed.

In the selection of the extract to be treated in accordance with the present invention it is essential to select an extract which, prior to treatment in accordance with the present invention, had not been subjected to such a thermal decomposition or chemical treatment as would destroy the resinous bodies which I desire to recover from the extract as a product of the invention. For instance, if the hydrocarbon oil from which the extract is derived was subjected, prior to solvent refining, to drastic thermal decomposition or chemical treatment, the resinous bodies which I wish retained in the extract might be decomposed or removed. If, on the other hand, the hydrocarbon oil from which the extract is obtained was subjected prior to solvent refining to vacuum distillation or careful fire and steam distillation (so as to prevent cracking or decomposition) or to mild refining treatment, the resinous bodies would not be decomposed or removed but would be contained in the extract.

A quantity of the solvent-free extract is mixed in a suitable vessel with any of the well known solvents for dewaxing hydrocarbon oil, including amyl alcohol, propyl alcohol, butyl alcohol, hexyl alcohol alone or in admixture including their isomers, their isomeric mixtures and esters. I prefer to use amyl alcohol or mixtures of amyl alcohols as the solvent since I find that this solvent not only removes the wax but in addition removes any asphaltenes as well as heavy waxy resinous intermediate compounds which may be present and which might affect the quality of the resinous product to be obtained. In using amyl alcohol or mixtures of amyl alcohols I find that I get desirable results with the use of approximately equal quantities of extract and solvent. The quantity of alcohol used will, of course, depend upon the nature of the extract being treated, the content of wax, asphaltenes or undesirable waxy or resinous intermediate products. The mixture is slowly agitated for a period long enough to precipitate the wax, asphaltenes and objectionable waxy or resinous intermediate products with such control in temperature as may be required depending upon the quantity and quality of the compounds to be removed and the amount of solvent used.

The temperature to be maintained during agitation may vary widely depending on the factors hereinbefore enumerated in determining the proportion of solvent to use. With a solvent-free extract resulting from the furfural treatment of lubricating oil containing approximately 5% of material to be precipitated, I find that I secure the best results at a temperature of approximately 70° F. If the extract contains a percentage of constituents to be precipitated higher than 5% the temperature may be lower than 70° F. Conversely, if the extract to be treated contains a percentage of constituents to be precipitated materially lower than 5%, then the temperature may be increased in proportion. The temperature bears some relation to the quantity of amyl alcohol or other solvent used. For instance, if the amyl alcohol is used in large quantity the temperature may be raised. If the percentage of amyl alcohol is small then the temperature may be decreased. To one skilled in the art, the proper solvent, the proportion of such solvent, and the temperature to be selected, could be easily determined, having in mind that the object of the solvent treatment at this stage is to precipitate those constituents which are undesirable in the final resin.

The time required for precipitation will of course vary but I have found that twelve to twenty-four hours of slow agitation in the presence of the solvent is sufficient to bring about the desired precipitation. The time to which the mixture is subjected to agitation is determined by ascertaining the time when no substantial further precipitation would take place. This is determined by intermittent removal of samples from the slowly agitating body of liquid.

The agitation is then stopped and the mixture or solution freed from the precipitate by filtering or centrifuging under conditions designed to remove the precipitated bodies. In the event the mixture or solution is filtered, the usual filter aids may be utilized to permit the formation of a filter cake. To assist in filtering the mixture, it may be allowed to first settle prior to filtering. After removal of precipitated bodies, the liquid is diverted to intermediate storage and the amyl alcohol or other solvent recovered for reuse by atmospheric distillation. The solvent-free liquid is then suitable for further processing to recover resins of varying characteristics.

At this point I wish to emphasize the fact that the extract treated according to the present invention may vary widely as hereinbefore pointed out and naturally such widely varying extracts require different processing. For instance, where the extract is derived from a lubricating oil distillate having a viscosity of 40 seconds Saybolt universal at 210° F., the liquid recovered from the amyl alcohol treatment will contain a rather high percentage of lighter constituents which must be removed at this stage by distillation. On the other hand, where the extract is derived from a lubricating oil distillate having a viscosity of 120 seconds Saybolt universal at 210° F., the percentage of lighter fractions is greatly reduced, and the distillation necessary at this stage to remove such lighter fractions may be regulated accordingly. Similarly, when the extract is derived from residues or distillates having viscosities higher than 120 seconds Saybolt universal at 210° F., the percentage of lighter fractions to be removed by distillation at this stage approaches a minimum and the distillation is to be correspondingly regulated.

The following is an illustrative example of the distillation which may take place at this stage to remove the lighter fractions just referred to:

The solvent-free liquid may be subjected to a vacuum distillation running to a vapor temperature of approximately 660° F., under 29½ inches of mercury. Lower or higher temperature may be used to produce a resin of lower or higher viscosity. This distillation is carried on as rapidly as possible under conditions to avoid thermal decomposition or cracking. I do not wish to be limited to vacuum distillation as any distillation process which avoids cracking may be utilized. The residue resulting from this distillation is then recovered as a product of the process. The hot resinous residue may be subjected to a mild filtering or contact treatment to remove moisture clouds, suspended matter, colored constituents (if it is desirable to remove them), or other impurities.

This treatment is not to be confused with the treatment hereinbefore specifically disclaimed wherein the hydrocarbon oil, prior to solvent extraction, had been subjected to such thermal decomposition or chemical treatment to decompose or remove gums and color-forming bodies as would destroy the constituents which produce resins which I desire to recover from the extract. The filtering or contact step to remove undesirable constituents formed in the hot resinous residue is a treatment regulated to retain the resinous constituents which I desire in my product.

The cooled resin has the following general characteristics: Iodin number of 5 to 100 depending on the type of crude from which the extract was derived, the viscosity of the extract, and the percentage of distillation following the amyl alcohol or other solvent treatment. The most desirable resin produced by the present process has an iodin number preferably above 35. The resin is a viscous liquid, more or less brown in color, translucent in thin films, and has the property of absorbing oxygen. The viscosity may range from 40 seconds Saybolt universal at 100° F., to 1000 seconds Saybolt furol at 210° F.

The resin is substantially completely soluble in, or compatible with, the vegetable and marine drying oils. It is compatible with resins, both natural and synthetic, in all proportions. It is soluble in, and compatible with, nitrocellulose and similar lacquer dopes and ingredients. It is substantially completely soluble in carbon tetrachloride, carbon bisulphide, 86° A. P. I. naphtha, acetone, turpentine, chloroform, benzol and similar solvents including those hereinbefore specified for use in conventional solvent extraction processes.

The resin is substantially free from asphaltenes and paraffins and is substantially aromatic in character.

It has a combined oxygen content in excess of the oxygen content of petroleum hydrocarbons of substantially the same molecular weight or boiling range. It has the property of hardening by oxidation in thin films, facilitated by the use of elevated temperatures. The resin responds to treatment with metallic driers such as oxides of manganese, lead, zinc, cobalt or the like, to a degree approaching vegetable and marine drying oils.

The resin has a relatively high boiling range. Its initial boiling point is in excess of 500° F., under a vacuum of 29.5 inches of mercury.

The following is a description of the use of the resinous product of this invention in a core oil. The resin may be mixed with a conventional drying oil or resin used in core oils in the proportion of approximately 60 parts of my resinous product with 40 parts of the drying oil or resin, by weight. This mixture may be thinned with kerosene or similar diluent to reduce its viscosity. The diluted mixture is then mixed with the core sand which results in a friable, non-binding mass which is then heated in an oven to approximately 300° F., or higher. The mixture absorbs oxygen resulting in drying and binding the sand together to make a hard, durable, non-friable core.

I have found that the resinous product of the present invention when used in core oils as above described, materially increases the strength of the core. Numerous tests have shown that cores made with the resin of the present invention in the manner described have a 65 per cent greater average breaking strength than cores made with linseed oil in the conventional manner.

A core oil which has proven highly satisfactory, utilizing my resin, was compounded in the proportions of approximately 50% resinous product of this invention, 10% balata rubber resin and 40% drying oils or resins. The core oil produced following this formula, when diluted to the proper consistency, proved to be a superior core oil as compared with core oils made with linseed oil in the conventional manner.

The fact that the resin of the present invention is soluble in and compatible with this type of rubber resin and rubber itself (latex for instance) is quite interesting as an indication of the scope of its possibilities. I have found that latex rubber is soluble in the resinous product of the present invention to about 25% as compared with asphalt, for instance, which does not dissolve over 8–10%.

I attribute the advantages which the balata rubber resin gives when blended with my resin to the quality of my resin in being able to dissolve, being compatible with, and hold in solution, rubber resins and rubber compounds, a property which few resins, natural or synthetic, or asphalt-like material will have.

In the use of the resinous product of this invention as a paint or varnish, the resin is mixed with the usual varnish or paint adjuvants to partially replace linseed oil, resin, or other usual paint or varnish vehicles. As hereinbefore pointed out, the resin is translucent enough to permit pastel shades to be secured with light colored pigments.

One advantage of using the resin of this invention in the manufacture of varnishes is as follows: In manufacturing varnishes, China wood oil or similar oil is bodied under temperature to promote polymerization. This bodying continues until the oil has a string. At that time it is important to immediately check further polymerization by a sharp drop in temperature, otherwise the varnish would check or alligator. In using the resin of the present invention in the manufacture of varnishes with such bodied oil, the cold resin may be poured into the heated mass of oil being bodied, thus immediately checking further polymerization by sharply reducing the temperature, with no loss of volatile matter.

As another advantage of the use of the resin of the present invention in paints and varnishes it is well known to those skilled in the art that films resulting from linseed oil, or oils similar to linseed oil, are porous and are not entirely water-resistant. By admixture of such oils with the resin of the present invention and a suitable drier, the resulting film is rendered non-porous and highly resistant to water.

It is not thought necessary to further encumber this specification with illustrations of the method of compounding the resin to render it suitable for use in the arts except to state that it may be compounded to produce coatings, insulations, saturants, rust-proofing, belt dressings, leather treatment and lacquers.

As a matter of fact the resin of the present invention may be used as a substitute or partial substitute for vegetable drying oils, marine oils, resins, gums, and synthetic resins in the manufacture of paints, varnishes and lacquers; as a substitute for rosin oil in lubricants; as a substitute or partial substitute for phenol-aldehyde condensation products and plastics; and as a coating for the inside of edible food and liquid containers, and in the manufacture of waxes and polishes.

I claim as my invention:

1. A process for recovering liquid resinous bodies from the extract resulting from the solvent treatment of hydrocarbon oil which has not previously been subjected to cracking or chemical treatment and containing asphaltenes, paraffins, and resinous bodies which comprises treating solvent-free extract with a dewaxing solvent to precipitate the wax, asphaltenes and objectionable waxy or resinous intermediate products, freeing the precipitate from the liquid, separating the solvent from the liquid and recovering the resinous solvent-free liquid as a product of the process.

2. A process for recovering liquid resinous bodies from the extract resulting from the solvent treatment of hydrocarbon oil which has not previously been subjected to cracking or chemical treatment and containing asphaltenes, paraffins, and resinous bodies which comprises treating solvent-free extract with a dewaxing solvent comprising essentially an alcohol to precipitate the wax, asphaltenes and objectionable waxy or resinous intermediate products, freeing the precipitate from the liquid, separating the solvent from the liquid and recovering the resinous solvent-free liquid as a product of the process.

3. A process for recovering liquid resinous bodies from the extract resulting from the solvent treatment of hydrocarbon oil which has not previously been subjected to cracking or chemical treatment and containing asphaltenes, paraffins, and resinous bodies which comprises treating solvent-free extract with a dewaxing solvent comprising essentially amyl alcohol to precipitate the wax, asphaltenes and objectionable waxy or resinous intermediate products, freeing the precipitate from the liquid, separating the solvent from the liquid and recovering the resinous solvent-free liquid as a product of the process.

4. A process such as claimed in claim 1 wherein the dewaxing solvent is recovered for re-use by distillation after separation of the precipitated bodies.

5. A process such as claimed in claim 1 wherein the mixture or solution is freed from the precipitate by filtering or centrifuging under conditions designed to remove the precipitated bodies.

6. A petroleum resin in the form of a viscous liquid derived from the residue resulting from the solvent treatment of hydrocarbon oil which has not previously been subjected to cracking or chemical treatment, substantially free from asphaltenes and paraffins, substantially aromatic in character and having a combined oxygen content in excess of the oxygen content of petroleum hydrocarbons of substantially the same molecular weight or boiling range.

7. A petroleum resin derived from the residue resulting from the solvent treatment of hydrocarbon oil which has not previously been subjected to cracking or chemical treatment, consisting of a viscous liquid, substantially brown in color, translucent in thin films, having the property of absorbing oxygen, being substantially free from asphaltenes and paraffins and further characterized in that latex rubber is soluble therein to approximately 25%.

8. A petroleum resin derived from the residue resulting from the solvent treatment of hydrocarbon oil which has not previously been subjected to cracking or chemical treatment, consisting of a viscous liquid having the property of absorbing oxygen, being substantially free from asphaltenes and paraffins and further characterized in that latex rubber is soluble therein to approximately 25%.

9. A petroleum resin derived from the residue resulting from the solvent treatment of hydrocarbon oil which has not previously been subjected to cracking or chemical treatment, consisting of a viscous liquid having the property of absorbing oxygen, being substantially free from asphaltenes and paraffins having an initial boiling point in excess of 500° F. under a vacuum of 29.5 inches of mercury.

10. A petroleum resin derived from the residue resulting from the solvent treatment of hydrocarbon oil which has not previously been subjected to cracking or chemical treatment, consisting of a viscous liquid having the property of absorbing oxygen, being substantially free from asphaltenes and paraffins having the property of responding to treatment with metallic driers to a degree approaching vegetable and marine drying oils.

11. A petroleum resin derived from the residue resulting from the solvent treatment of hydrocarbon oil which has not previously been subjected to cracking or chemical treatment, consisting of a viscous liquid having the property of absorbing oxygen, being substantially free from asphaltenes and paraffins and substantially completely soluble in or compatible with vegetable and marine drying oils.

12. A process for recovering liquid resinous bodies from the extract resulting from the solvent treatment of hydrocarbon oil which has not previously been subjected to cracking or chemical treatment and containing non-resinous bodies and resinous bodies, which comprises treating solvent-free extract with a solvent to precipitate the non-resinous bodies and objectionable resinous intermediate product, separating the precipitate from the resinous liquid, separating the solvent from the resinous liquid and recovering the resinous solvent-free liquid as a product of the process.

13. A process such as claimed in claim 12 wherein the solvent is recovered for re-use by distillation after separation of the precipitated bodies.

14. A process such as claimed in claim 12 wherein the resinous liquid remaining after removal of the solvent is subjected to controlled distillation to distill off lighter fractions thereof to bring about a substantial increase in the viscosity of said resinous liquid.

15. A process such as claimed in claim 12 wherein the resinous liquid remaining after removal of the solvent is subjected to vacuum distillation under conditions avoiding thermal decomposition to distill off the lighter fractions and increase the viscosity of the resinous liquid.

EVERETT H. CRAWLEY.